United States Patent [19]

Hayashi et al.

[11] 4,402,376

[45] Sep. 6, 1983

[54] VEHICLE SPEED CONTROL APPARATUS

[75] Inventors: Kazuhiko Hayashi, Toyota; Kou Tanigawa, Akashi; Takashi Egusa, Kobe, all of Japan

[73] Assignees: Toyota Jidosha K.K., Toyota; Fujitsu Ten Limited, Kobe, both of Japan

[21] Appl. No.: 247,836

[22] Filed: Mar. 26, 1981

[30] Foreign Application Priority Data

Mar. 28, 1980 [JP] Japan .................................. 55-40189[U]

[51] Int. Cl.³ ............................................. B60K 31/00
[52] U.S. Cl. ...................................... 180/179; 123/350; 123/360; 364/426
[58] Field of Search ....................... 180/179, 170–178; 123/360–361, 350–352, 365; 364/426, 431.05, 424, 425; 200/61.9; 416/50

[56] References Cited

U.S. PATENT DOCUMENTS

| 3,715,006 | 2/1973 | Walsh | 123/352 |
| 3,800,904 | 4/1974 | Zelenka | 180/105 E |
| 3,804,193 | 4/1974 | Ikuta | 180/105 E |
| 3,820,624 | 6/1974 | Sakakibara | 180/105 E |
| 3,885,644 | 5/1975 | Seidler et al. | 180/105 E |
| 3,952,829 | 4/1976 | Gray | 180/105 E |
| 4,211,193 | 7/1980 | Cox | 180/179 |
| 4,267,491 | 5/1981 | Collonia | 180/179 |

OTHER PUBLICATIONS

Fujitsu, vol. 30, No. 5, p. 100, "Cruise Control System".

Primary Examiner—David M. Mitchell
Assistant Examiner—Timothy Roesch
Attorney, Agent, or Firm—Kenyon & Kenyon

[57] ABSTRACT

A set switch 28 is connected via a first gate 34 to an analog switch 16, a speed incrementing circuit 36, and a latch circuit 30, but is connected directly to a second gate 22. When set switch 28 is actuated, a setting signal is passed through the first gate 34, unless the gate is closed by a signal from an upper-speed limit switch 38, thereby actuating analog switch 16 to pass vehicle speed signals from detector 10 to a storage device 18, and actuating latch circuit 30 to partially enable second gate 22. When set switch 28 is released, analog switch 16 closes, thereby storing the present vehicle speed signal in device 18 as a desired speed signal, and second gate 22 is fully enabled, thereby passing an actual speed/desired speed difference signal from comparator 20 to a speed controller 26. Desired speed can be incremented via circuit 36 by tap-up actuation of set switch 28, but the direct connection of set switch 28 to second gate 22 permits speed retard by actuation of set switch 28 even if the first gate is shut by a signal from upper-speed limit switch 38.

5 Claims, 2 Drawing Figures

VEHICLE SPEED CONTROL APPARATUS

BACKGROUND OF THE INVENTION

The present invention relates to a vehicle speed control apparatus of an automobile and more particularly relates to an apparatus for automatically maintaining the vehicle speed at a desired speed without driver operation of the accelerator pedal. Such operation is frequently referred to as cruise control.

A conventional vehicle speed control apparatus consists of a storing device which stores the actual running speed of an automobile at the time when a set switch is operated, a comparator which compares the actual running speed with the stored running speed, and a speed adjustor which adjusts the opening degree of a throttle valve to maintain the running speed of the automobile at the stored running speed, in other words, at the desired running speed.

In such a vechicle speed control apparatus, after the set switch has been actuated by the driver for setting the desired vehicle speed to be maintained (setting operation), the set switch, is additionally used for decreasing the desired vehicle speed which has been set (referred to as the "retard operation") as well as used for slightly increasing the desired vehicle speed. The set switch is actuated and then released by the driver, and the setting operation is effected by storing an electrical signal representing the actual vehicle speed when the operating set switch returns to the non-operating condition. The speed thus selected is referred to as the desired vehicle speed. The retard operation is effected by moving the throttle valve toward its closing direction when the set switch is operating. The tap-up operation is effected by briefly actuating the set switch when the vehicle is operating under control of the speed-controlling apparatus, thereby slightly increasing the stored vehicle speed, for example, by increasing the stored vehicle speed by 2 to 3 km/h when the operating set switch returns to the non-operating condition. Furthermore, in such a vehicle speed control apparatus, a high-speed limit circuit is provided for forcibly inhibiting all the above-mentioned functions of the set switch from being done when the actual vehicle speed exceeds a predetermined upper limit speed, for example, a speed of 100 km/h.

However, conventional vehicle speed control systems of the above-mentioned type have the following problem. If the stored vehicle speed signal exceeds the predetermined upper limit speed due to carrying out the tap-up operation and thus the actual vehicle speed exceeds the upper limit speed, it becomes quite impossible to decrease the vehicle speed by operating the set switch, in other words, quite impossible to excecute the retard operation. This is because all functions of the set switch are inhibited by the high-speed limit circuit when the vehicle speed exceeds the predetermined upper limit speed.

SUMMARY OF THE INVENTION

It is, therefore, an object of the present invention to provide a vehicle speed control apparatus of an automobile, whereby the retard operation can be effected even when the vehicle speed is higher than the predetermined upper limit speed of the high-speed limiter circuit.

According to the present invention, the vehicle speed control apparatus includes instruction switch means operated by the driver for generating a first electrical signal to select a desired speed or to initiate retard or tap-up operations. The first electrical signal controls a memory device to memorize an electrical signal corresponding to the desired vehicle speed. The apparatus also includes means for detecting the actual vehicle speed of the automobile and for generating an electrical signal which indicates the detected vehicle speed and means for comparing the level of the electrical signal representative of the actual vehicle speed with the level of the stored electrical signal and for generating a control signal corresponding to the result of the above-mentioned comparison. The signal from the comparing means is available to be applied to a throttle control for increasing or decreasing the opening degree of a throttle valve of the automobile to reduce the difference between the actual vehicle speed and the desired vehicle speed.

A first gate is connected between the instruction switch means and the memory device to prevent the first electrical signal from being applied to the memory device when the actual vehicle speed of the automobile exceeds a predetermined upper-limit speed, and a second gate is connected between the instruction switch means and the throttle control to prevent the signal from the comparison means from being applied to the throttle control means when the first electrical signal is applied, wherein the first electrical signal is directly applied to the second gate means from the instruction switch means without passing through the first gate means. As a result of applying this signal directly to the second gate means, the vehicle speed will be retarded, no matter how high it has been set.

The above and other related objects and features of the present invention will be apparent from the description of the present invention set forth below, with reference to the accompanying drawings, as well as from the appended claims.

DETAILED DESCRIPTION OF A PREFERRED EMBODIMENT

Figure 1:
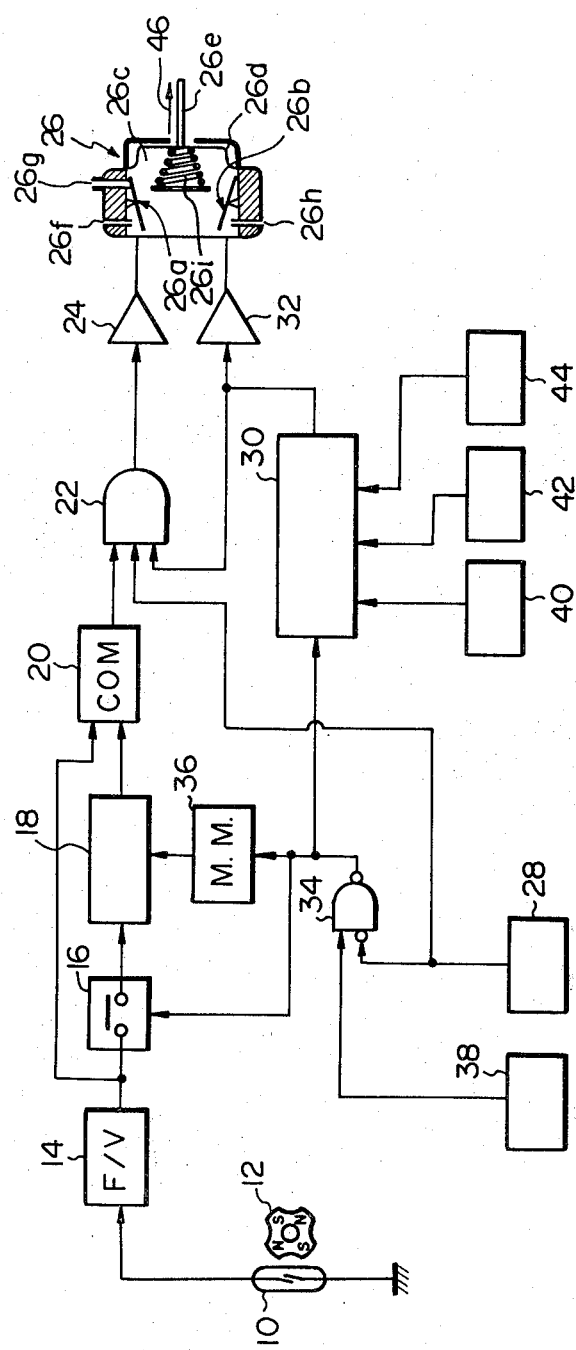
FIG. 1 is a block diagram illustrating an embodiment of the present invention.

Referring to FIG. 1, reference numeral 10 denotes a reed switch and 12 denotes a rotator of permanent magnets which is turned by a speedometer cable of an automobile. The switch 10 performs the operation of turn-on and turn-off in accordance with the revolution of the rotator 12, and produces pulse signals of a frequency which are proportional to the vehicle speed of the automobile. The pulse signals are converted by a frequency-voltage converter circuit (F/V converter circuit) 14 into a DC voltage having a level which corresponds to the vehicle speed. The reed switch, rotator, and frequency-voltage converter, combined, comprise speed-detecting means. When the analog switch 16 is turned on, the output voltage of the F/V converter circuit 14 is fed to memory means, such as a storing circuit 18, and the voltage, just before the analog switch 16 is turned off, is stored as a desired vehicle speed voltage in the storing circuit 18. The storing circuit 18 usually consists of a capacitor. The desired vehicle speed voltage stored in the storing circuit 18 is compared in comparison means, such as a comparator circuit 20, with the output voltage of the F/V converter circuit 14, i.e., with the voltage which corresponds to the actual running speed of the vehicle. The comparator circuit 20 produces pulse outputs having a duty ratio which is changed in accordance with the comparison result. The outputs from the comparator circuit 20 are fed to an actuator, or control means, 26 via a gate circuit 22 and a drive circuit 24. A control valve 26a of the actuator 26 is energized by the outputs from the comparator circuit 20 so that the energizing time period thereof is shortened when the actual vehicle speed is higher than the desired vehicle speed, and lengthened when the actual vehicle speed is lower than the desired vehicle speed. The gate circuit 22 opens only when both the outputs from instruction switch means, such as a set switch 28, and from a self-retaining, or latching, circuit 30, such as a flip-flop, are of the level of logic "1", and permits the outputs from the comparator circuit 20 to transmit therethrough to the drive circuit 24.

In addition to the control valve 26a, the actuator 26 has a release valve 26b, a control chamber 26c, a diaphragm 26d and a rod 26e. One end of the rod 26e is fixed to the diaphragm 26d and the other end of the rod 26e is coupled to an accelerator link (not illustrated) for actuating a throttle valve (not illustrated) of the automobile. The diaphragm 26d is actuated by the pneumatic pressure in the control chamber 26c and by the spring force. The pneumatic pressure in the control chamber 26c is controlled by the control valve 26a and the release valve 26b. The control valve 26a, as mentioned hereinbefore, is energized and deenergized in response to the outputs from the comparator circuit 20, and the release valve 26b is energized and deenergized in response to the output of the self-retaining circuit 30 introduced through a drive circuit 32. When the control valve 26a is energized, pressure in the control chamber 26c is reduced via a port 26g, and a port 26f is closed to prevent atmospheric pressure from being introduced into the chamber 26c. Contrary to this, when the control valve 26a is deenergized, the atmospheric pressure is introduced into the chamber 26c via the port 26f. When the release valve 26b is energized, a port 26h is closed to prevent atmospheric pressure from being introduced into the chamber 26c. Contrary to this, when the release valve 26b is deenergized, the port 26h is opened to introduce atmospheric pressure into the chamber 26c.

The set switch 28 produces an output of the logic level of "0" when it is operated by an operator, and produces an output of the logic level of "1" when it is non-operated. The analog switch 16 is turned on when the output of logic "0" of the set switch 28 is applied via the gate circuit 34, and is turned off when the output of the set switch 28 is inverted into logic "1". The output of logic "0" of the set switch 28 is also applied via the gate circuit 34 to set the self-retaining circuit 30. Furthermore, the output of logic "0" of the set switch 28 is directly applied to the gate circuit 22 to close it without passing through the gate circuit 34. When the set switch 28 is operated for only a very short period of time and is then returned to the non-operating condition, a monostable multivibrator 36 is energized at the moment when the output is inverted from logic "0" to "1", and the desired vehicle speed voltage stored in the storing circuit 18 is increased by a predetermined value that corresponds to 2 to 3 km/h of the vehicle speed.

The gate circuit 34 is closed when a limiter switch 38 of a high-speed limit circuit is turned on and the output of the limiter switch 38 changes to the logic "0". That is, the gate circuit 34 is closed when the actual vehicle speed exceeds a predetermined upper-limit speed, whereby the output of the set switch 28 is not fed to the analog switch 16, to the monostable multivibrator 36 or to the self-retaining circuit 30. In other words, the output of the gate circuit 34 is fixed to the logic "1".

The self-retaining circuit 30 retains the fact that the setting operation was effected by the set switch 28, and possesses a function for energizing the release valve 26b. The self-retaining circuit 30 is reset when the brake pedal is depressed causing a stop lamp switch 40 to turn on, when a parking brake switch 42 is turned on, or when either a clutch switch or neutral start switch 44 is turned on, thereby de-energizing the release valve 26b.

The operation of the embodiment will now be illustrated below. When the vehicle speed is lower than a predetermined upper-limit speed specified by the high-speed limit circuit while the vehicle speed control apparatus is in the initial condition, an operation of the set switch 28 to change its output from "1" to "0" causes the output of the gate circuit 34 to change from "0" to "1", and this causes the self-retaining circuit 30 to be set since the gate circuit 34 has been opened. Therefore, gate circuit 22 is partially enabled and the release valve 26b is energized and the port 26h for introducing atmospheric pressure is closed. At the same time, the analog switch 16 is turned on, by the "0" signal from the set switch 28 and the voltage corresponding to the actual vehicle speed is applied to the storing circuit 18. The analog switch 16 is turned off when the set switch 28 returns to the non-operating condition. Here, the voltage corresponding to the actual vehicle speed just before the analog switch 16 is turned off is stored in the storing circuit 18 as the desired vehicle speed voltage. When the set switch 28 returns to the non-operating condition, the gate circuit 22 is fully enabled, or opened, to allow the operation of the control valve 26a by signals from the comparator 20. Thereby, the actuator 26 controls the opening degree of the throttle valve so that the actual vehicle speed is kept equal to the stored vehicle speed.

When the set switch 28 is operated after the setting operation has been once effected, its output becomes "0", which disables the gate circuit 22 and thereby causes the output of the drive circuit 24 to drop to "0" while the set switch 28 is being operated. Therefore, the control valve 26a introduces the atmospheric pressure into the control chamber 26c, and the rod 26e moves toward the direction of arrow 46, being urged by a spring 26i. As a result, the throttle valve is actuated toward the closing direction, and the vehicle speed is decreased. When the set switch 28 is returned to the non-operating condition thereafter, the new, lower vehicle speed at the moment when the set switch 28 is returned is stored, and the control for automatically maintaining the vehicle speed at the lower speed, which is now a new desired vehicle speed, is effected in the same manner as mentioned earlier (retard operation).

When the set switch 28 is operated for a short period of time after the set operation has been effected, a monostable multivibrator 36 works to increase the desired vehicle speed voltage of the storing circuit 18 by a predetermined amount, so that the desired vehicle speed to be controlled is increased by 2 to 3 km/h (tap-up operation).

When any one of the stop lamp switch 40, brake switch 42, clutch switch or neutral start switch 44 is turned on, by actuation of the main brake pedal, the emergency brake, or the gearshift lever into neutral, respectively the self-retaining circuit 30 is reset. Therefore, its output becomes 0, which disables the gate circuit 22, causing the control valve 26a to deenergize. Furthermore, the release valve 26b is deenergized. Consequently, both the control valve 26a and the release valve 26b permit the introduction of atmospheric pressure, causing the diaphragm 26d to quickly return to the initial state and thus the vehicle speed control operation is stopped.

When the high-speed limit circuit is operated to turn on the limiter switch 38, the gate circuit 34 is closed. In this case, the setting operation or the tap-up operation by the set switch 28 cannot be carried out. However, since the output of the set switch 28 is fed to the gate circuit 22 without passing through the gate circuit 34, an operation of the set switch 28 causes the gate circuit 22 to be closed even when the high-speed limiter circuit is working, whereby the control valve 26a can introduce atmospheric pressure into the control chamber 26c to decrease the vehicle speed. When the vehicle speed is decreased by a small amount (by 2 to 3 km/h) below the predetermined upper-limit which is specified by the high-speed limiter circuit, the limit switch 38 will automatically be turned off, so that the switch 16 can be closed by continued actuation of the set switch 28, and ordinary retard operation can be effected to reduce the desired vehicle speed that is to be maintained.

Figure 2:
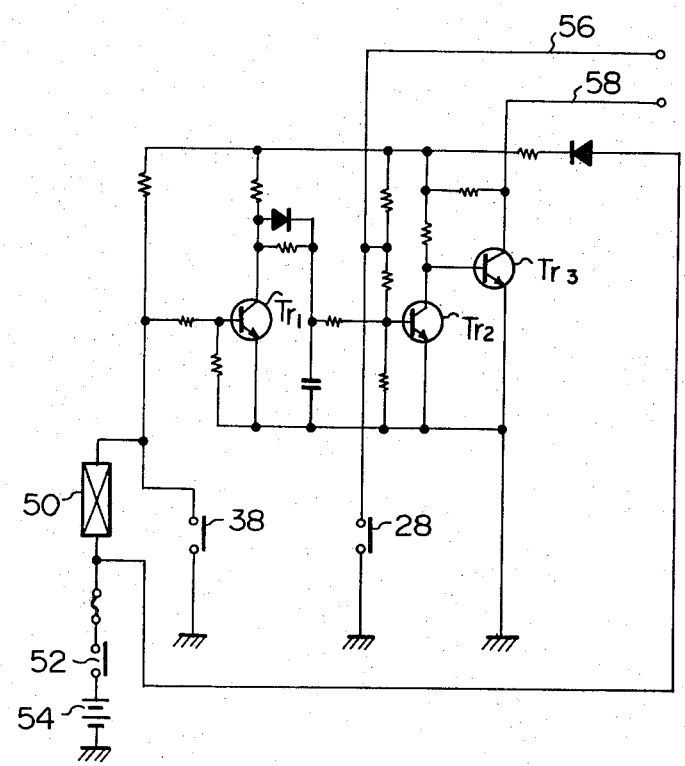
FIG. 2 is a circuit diagram of a part of FIG. 1.

FIG. 2 is a circuit diagram concretely illustrating the limiter switch 38, set switch 28 and gate circuit 34 in the embodiment of FIG. 1. In FIG. 2 shows the limiter switch 38 and the set switch 28, a speed alarming device 50, an ignition switch 52, a battery 54, a line which connects the set switch 28 to the gate circuit 22 of FIG. 1, and an output line 58 from the gate circuit 34 to the circuits 16, 30 and 36 of FIG. 1.

When the set switch 28 is turned on, the output of logic "0" is transmitted to the gate circuit 22 via the line 56. In this case, unless switch 38 is closed, a transistor $Tr_2$ becomes non-conductive and a transistor $Tr_3$ becomes conductive. Consequently, the output which is fed through the line 58 assumes logic "0". When the limiter switch 38 is turned on, a transistor $Tr_1$ becomes non-conductive and a voltage of a high level is applied at all times to the base of the transistor $Tr_2$. Accordingly, even when the set switch 28 is turned on, the transistor $Tr_2$ remains in the conductive state, and actuation of the set switch 28 produces no change in the voltage on the line 58. Even in this case, however, the output of the set switch 28 is transmitted to the gate circuit 22 as usual, via the line 56. Consequently, it is possible to stop the operation of the control valve 26a in the actuator 26 in order to reduce the vehicle speed even when the vehicle is running at such a speed that may cause the high-speed limit circuit consisting of the switch 38 and the transistor $Tr_1$ to operate.

According to this invention as illustrated in detail in the foregoing, the retard operation can be effected if the set switch (instruction switch) is operated even when the desired vehicle speed has been set to such a value that causes the high-speed limiter circuit to operate.

As many widely different embodiments of the present invention may be constructed without departing from the spirit and scope of the present invention, it should be understood that the present invention is not limited to the specific embodiments described in this specification, except as defined in the appended claims.

We claim:

1. A vehicle speed control apparatus in a vehicle having a throttle valve for adjusting the vehicle speed, the apparatus comprising:
   instruction switch means actuable by an operator of the vehicle for generating a first electrical signal;
   speed-detecting means for detecting the actual vehicle speed and for generating a second electrical signal which corresponds to the detected vehicle speed;
   memory means connected to the instruction switch means to be controlled by the first electrical signal therefrom to store a selected value of an electrical signal as a third electrical signal which corresponds to a desired vehicle speed;
   comparison means for comparing the second electrical signal with a third electrical signal and for generating a fourth electrical signal based on the result of the comparison;
   control means for controlling the setting of the throttle valve in response to said fourth electrical signal applied from said comparison means to reduce the difference between the actual vehicle speed and the desired vehicle speed;
   high-speed limit means for generating a fifth electrical signal when the vehicle speed exceeds a predetermined upper-limit speed;
   first inhibiting means connected to the high-speed limit means, to the instruction switch means, and to the memory means and responsive to said fifth electrical signal to prevent the first electrical signal from being applied to the memory means when the actual vehicle speed exceeds said predetermined upper-limit speed; and
   second inhibiting means connected directly to the instruction switch means, coupled to the comparison means and to the control means and responsive to said first electrical signal to prevent the fourth electrical signal from being applied to the control means whenever the instruction switch means is actuated to generate said first electrical signal.

2. The apparatus of claim 1, wherein the memory means comprises means for storing the level of the second electrical signal from the speed-detecting means when the instruction switch means is actuated, the stored second electrical signal being utilized as the third electrical signal corresponding to the desired vehicle speed.

3. The apparatus of claim 2, wherein the storing means comprises:
   analog switch means connected to the instruction switch means and to the speed detecting means and responsive to the first electrical signal for allowing the second electrical signal from the detecting means to pass therethrough; and
   a voltage storing device connected between the analog switch means and the comparison means for storing the voltage level of the second electrical signal applied from the analog switch means as the third electrical signal corresponding to the desired vehicle speed.

4. The apparatus of claim 1, wherein the apparatus further comprises means connected to the memory means and to the instruction switch means for increasing the level of the third electrical signal stored in the memory means by a predetermined increment in response to removal of a first electrical signal applied thereto from the instruction switch means.

5. The apparatus of claim 4, wherein the instruction switch means is connected to the increasing means via the first inhibiting means, whereby the first electrical signal is prevented from being applied to the increasing means when the actual vehicle speed exceeds the predetermined upper-limit speed.

* * * * *

UNITED STATES PATENT AND TRADEMARK OFFICE
CERTIFICATE OF CORRECTION

PATENT NO. : 4,402,376
DATED : September 6, 1983
INVENTOR(S) : Kazuhiko Hayashi, et al It is certified that error appears in the above—identified patent and that said Letters Patent is hereby corrected as shown below:

Change the Name of the Assignee from:

"Toyota Jidosha K.K. and Fujitsu Ten Limited" to

--Toyota Jidosha Kogyo Kabushiki Kaisha and Fujitsu Ten Limited--.

Col. 1, line 65; Col. 3, line 67; Col. 4, line 1; Col. 5, lines 13, 19, 24, 31, 44 and 61, change "limiter" to --limit--.

Col. 5, line 34, after "line" insert --56--.

Signed and Sealed this

Tenth Day of January 1984

[SEAL]

Attest:

GERALD J. MOSSINGHOFF

*Attesting Officer*    *Commissioner of Patents and Trademarks*